3,547,871
HIGHLY FILLED CASTING COMPOSITION
Charles F. Hofman, Monroeville, Pa., assignor to Westinghouse Electric Corporation, Pittsburgh, Pa., a corporation of Pennsylvania
Continuation-in-part of application Ser. No. 447,237, Apr. 12, 1965. This application Aug. 2, 1968, Ser. No. 749,846
Int. Cl. C08g *51/04;* C08k *1/02*
U.S. Cl. 260—37
3 Claims

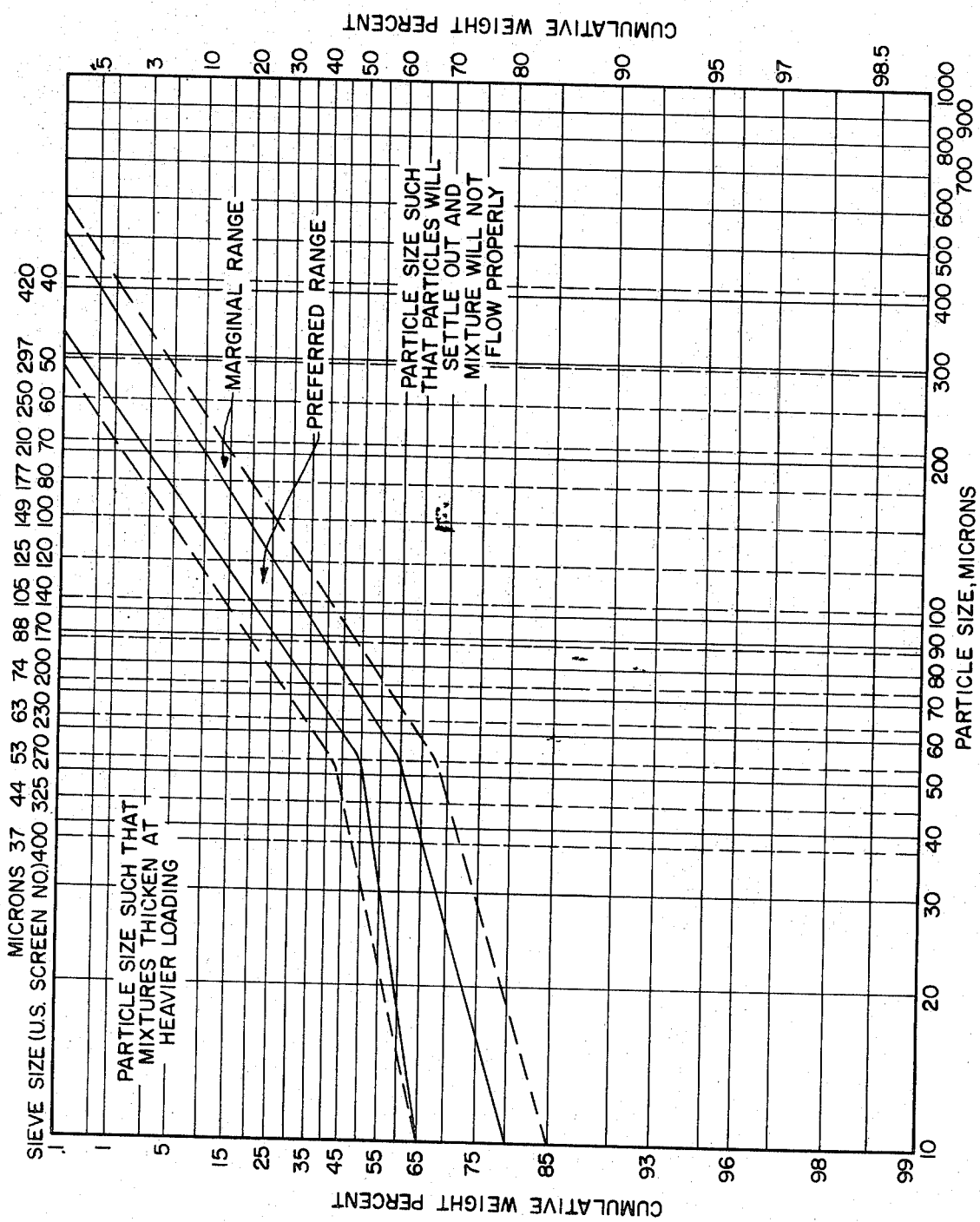

ABSTRACT OF THE DISCLOSURE

A fluid casting composition having a viscosity below about 20,000 cp. is made from liquid resin, curing agent, resin curing accelerator and as high as 86% by weight mineral filler characterized by a coefficient of linear thermal expansion not greater than $8 \times 10^{-6}$ inch/inch/° C. and a critical particle size range. Said filler particle range being established by the following table:

| Cumulative wt. percent | Particle size, microns | Sieve size, mesh (U.S. screen No.) |
|---|---|---|
| 0.1–4 | >297 | 50 |
| 0.3–9 | >250 | 60 |
| 1–14 | >210 | 70 |
| 4–26 | >149 | 100 |
| 9–34 | >125 | 120 |
| 14–41 | >105 | 140 |
| 20–48 | >88 | 170 |
| 28–56 | >74 | 200 |
| 34–62 | >63 | 230 |
| 42–68 | >53 | 270 |
| 45–70 | >44 | 325 |
| 47–73 | >37 | 400 |
| 56–79 | >20 | |
| 65–85 | >10 | |

CROSS REFERENCE TO RELATED APPLICATIONS

The present application is a continuation-in-part of U.S. patent application Ser. No. 447,237, filed on Apr. 12, 1965, now abandoned.

BACKGROUND OF THE INVENTION

The present invention relates to mineral filler compositions adapted for use in liquid resinous casting materials. More particularly, the invention relates to mineral filler distributions which permit exceptionally high loading of liquid resins for use as insulating materials for electrical apparatus. The invention includes the mineral fillers, liquid resinous insulating compositions containing them, and electrical apparatus insulated therewith.

Encapsulating of electrical apparatus with resinous insulating compositions has been practiced in the electrical art for many years. The practice has been beset by numerous problems stemming mainly from the operating conditions of the so-insulated electrical equipment. This has been particularly true in the case of electrical equipment subject to thermal cycling where both low and high temperatures have been encountered. For example, electrical transformers, bushings, rectifiers, and the like are subjected, in use, to both very low and very high temperatures.

One of the main problems attending the encapsulation of electrical equipment with resinous insulation resides in the widely divergent thermal expansion properties of the metals involved and the resinous insulation. As a class, metals commonly used in electrical apparatus such a aluminum, copper, steel, etc. have coefficients of linear thermal expansion which are much lower than those of the resinous insulation compositions. Thus, upon thermal cycling of the insulated apparatus, the physical stresses imposed thereon are sufficiently severe to cause cracking of the insulation and, ultimately, failure of the apparatus.

It has been recognized that mineral fillers, when present in resinous insulation, result in lowering of the thermal expansion of the insulation. Attempts have therefore been directed toward the attainment of a closer correlation of the thermal expansion properties of the metals and insulation. To a certain extent, improvements have been made in this direction in recent years. The advent of the glycidyl polyethers, commonly called epoxy resins, have been of great benefit to the electrical industry. Epoxy resins, in liquid form, have been widely used as encapsulants for electrical apparatus. Their ability, as a class, to remain hard and rigid when heated and to withstand cracking upon sub-zero cooling has been of great importance. However, when so-encapsulated metal electrical components have been subjected to thermal cycling, inevitably cracking of the insulation has occurred. This has been true even where substantial amounts of mineral fillers have been incorporated in the epoxy resin insulating compositions.

SUMMARY OF THE INVENTION

The present invention, therefore, has as its primary object the provision of a greatly improved mineral filler system for use with liquid resinous compositions as encapsulants for electrical apparatus.

Another object of the invention resides in the provision of a low viscosity highly filled liquid resinous composition which still remains very fluid in casting procedures.

A further object resides in the provision of a mineral filler resinous electrical insulation characterized by thermal expansion properties approximating the thermal expansion properties of the metals employed in the electrical apparatus.

A still further object of the invention resides in the provision of electrical apparatus insulated with a resinous-mineral filled composition capable of withstanding severe thermal cycling while still maintaining its outstanding electrical insulating properties.

Briefly the present invention accomplishes the above cited objects by providing a critical particle size range for mineral fillers for use in resinous casting compositions that will impart fluidity at filler loadings as high as 86 percent by weight and by using fillers having a coefficient of linear thermal expansion not greater than $8 \times 10^{-6}$ inch/inch/° C.

BRIEF DESCRIPTION OF THE DRAWING

Other objects of the invention will, in part, be obvious and will, in part, become apparent from the following detailed description thereof. The description will be given with particular reference to the drawing in which the single figure is a cumulative logarithmic graph which shows the particle size distribution range of particulate mineral fillers contemplated by the invention.

DESCRIPTION OF THE PREFERRED EMBODIMENTS

It was discovered that there is a critical relationship in the particle size distribution in mineral fillers which permits them to be incorporated in liquid resinous compositions in much greater amounts than have heretofore been possble. The discovery was attended by a number of desirable features. First, a greater amount of filler may be dispersed in the liquid resin while still obtaining viscosities below 20,000 cps. and thus desirable pouring properties. Second, the mineral-filled resins upon curing have thermal expansion properties much closer to those of the metals involved than prior art materials. Third, that the practice of the invention results in obtaining encapsulated electrical apparatus having outstanding electrical properties and greatly improved resistance to cracking during severe thermal cycling.

The generic features of the invention are shown in the logarithmic graph of the drawing. As indicated, the preferred particle size distribution range of mineral filler particles is that region of the graph lying between the solid lines. The marginal operating range is the area outside the solid lines and within the dotted lines. The graph itself is a cumulative logarithmic plot showing in the vertical axis the cumulative weight percent of particulate filler material greater than a corresponding filler particle size shown in the horizontal axis in sieve size (U.S. Screen No.) and in microns.

The graph is to be interpreted in the manner set forth in Testing Sieves, Handbook 53, 1964 edition, the W. S. Tyler Co., at pages 20–22. By cumulative weight percent is meant the weight percent of the mineral filler sample which would remain or be caught on one testing sieve if only that one sieve were used for testing the entire filler sample or the weight percent of the filler sample greater than a particular particle size.

Thus, it is seen from the graph showing the critical particle size range of this invention that 65–85 percent by weight of filler particles are greater than (>) 10 microns in size, that 56–79 percent by weight of filler particles are greater than 20 microns in size. Also, it is seen, for example, that .3–9 percent by weight of filler particles are greater than 250 microns and will be retained or caught in a 60 mesh sieve if only that one sieve were used in the particle size analysis.

Inasmuch as the present invention is directed to the insulation of electrical equipment, a further critical limitation is that the mineral filler has a coefficient of linear thermal expansion (C.L.T.E.) not appreciably higher than $8 \times 10^{-6}$ inch/inch/° C. Minerals having higher thermal expansion values, when combined with resinous electrical insulation, do not provide expansion properties correlative with the thermal expansion properties of the commonly employed metals. Thus, for example, silica ($8 \times 10^{-6}$), fused quartz ($0.5 \times 10^{-6}$), beryllium aluminum silicate ($1.00 \times 10^{-6}$), and lithium aluminum silicate ($0.13 \times 10^{-6}$) are preferred mineral filler materials although other minerals within this range may also be employed. Resinous insulation containing minerals having C.L.T.E. values higher than about $8 \times 10^{-6}$ inch/inch/° C. also seem to exhibit more extensive cracking in thermal cycling.

The mineral filler will have the following particle size distribution range.

TABLE I

| Cumulative wt., percent | Particle size, microns | Sieve size mesh (U.S. screen No.) |
| --- | --- | --- |
| 0.1–4 | >297 | 50 |
| 0.3–9 | >250 | 60 |
| 1–14 | >210 | 70 |
| 4–26 | >149 | 100 |
| 9–34 | >125 | 120 |
| 14–41 | >105 | 140 |
| 20–48 | >88 | 170 |
| 28–56 | >74 | 200 |
| 34–62 | >63 | 230 |
| 42–68 | >53 | 270 |
| 45–70 | >44 | 325 |
| 47–73 | >37 | 400 |
| 56–79 | >20 |  |
| 65–85 | >10 |  |

These values correspond to the logarithmic graph and provide a series of sets of points defining that graph. It is to be understood that where no sieve size is given the cumulative weight percent values correspond to the particle size as measured by the MSA Whitby Centrifuge Technique or other well known particle measuring technique. As can be seen, if only a 100 mesh sieve were in the particle size analysis, 4.0–26 percent by weight of the total filler sample would be retained on that sieve. If a 200 mesh sieve were used alone 28–56 percent by weight of the total filler would be retained on the 200 mesh sieve.

When a mineral filler having the particle size distribution given in Table I is mixed in an amount of about 80 percent by weight with a liquid epoxy resin of appropriate viscosity, the mix will have a maximum viscosity at 100° C. of about 20,000 centipoises. Where appreciably higher loadings are desired it may be necessary to employ a diluent. Monoglycidyl ethers are suitable diluents for the epoxy resins. It is also to be understood that mixtures of mineral fillers may be employed and that the filler will tolerate, to a small extent, minerals having a coecient of linear thermal expansion slightly greater than $8 \times 10^{-6}$ inch/inch/° C. Also, other minerals of high specific gravity such, for example, as zirconium silicate which has a C.L.T.E. of $4.5$–$4.6 \times 10^{-6}$ inch/inch/° C. may be employed.

We do not wish to be limited to the use of any particular kind of resin since almost any liquid resinous composition would benefit from being filled with the particulate minerals of the invention. However, the epoxy resins and epoxy novolacs have exhibited the best resistance to thermal cycling. For this reason, the present description will emphasize the combination of the novel mineral filler system with these resins. It is to be understood that other well known resins such as polyesters, phenolics and silicones could be employed.

The resinous epoxy and/or epoxy novolac compositions are, as stated hereinabove, liquids or in the case of epoxy-novolacs, easily soluble. They may be prepared by reacting predetermined amounts of at least one polyhydric phenol and at least one epihalohydrin in an alkaline medium.

Phenols which are suitable for use in preparing the resinous polymeric epoxides include those which contain at least two phenolic hydroxide groups per molecule. Polynuclear phenols which have been found to be particularly suitable include those where the phenol nuclei are joined by carbon bridges such, for example as 4,4'-dihydroxy-diphenyl-dimethyl-methane (referred to hereinafter as bisphenol A), 4,4'-dihydroxy-diphenyl-methyl-methane and 4,4'-dihydroxy-diphenyl-methane. In admixture with the named polynuclear phenols, use may also be made of those polynuclear phenols wherein the phenolic nuclei are joined by sulfur bridges such, for example, as 4,4'-dihydroxy-diphenyl-sulfone. Moreover, the cycloaliphatic epoxies may also be employed.

While it is preferred to use epichlorohydrin as the epihalohydrin in the preparation of the resinous polymeric epoxides of the present invention, homologues thereof, for example, epibromohydrin and the like may also be used advantageously.

In the preparation of the resinous polymeric epoxides, aqueous alkali is employed to combine with the halogen of the epichlorohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide may be employed althought it is preferred to use sodium hydroxide since it is relatively inexpensive.

The product of the reaction, instead of being a single simple compound, is generally a complex mixture of glycidyl polyethers, but the principal product may be represented by the formula:

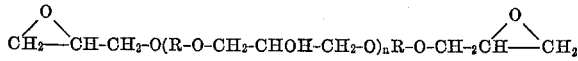

wherein $n$ is an integer of the series 0, 1, 2, 3, etc. and R represents the divalent hydrocarbon radical of the dihydric phenol. While for any single molecule of the polyether $n$ may be 0, the fact that the obtained polyether is a mixture of compounds causes the determined value for $n$, from molecular weight measurement, to be an average which is not necessarily zero or a whole number. Although the polyether is a substance primarily of the above formula, it may contain some material with one or both of the terminal glycidyl radicals in hydrated form.

The resinous polymeric epoxide, or glycidyl polyether of a dihydric phenol suitable for use in this invention has a 1,2-epoxy equivalency greater than 1.0. By epoxy equivalency reference is made to the average number of 1,2-epoxide groups:

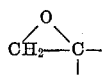

contained in the average molecule of the glycidyl ether. Owing to the method of preparation of the glycidyl polyethers and the fact that they are ordinarily a mixture of chemical compounds having somewhat different molecular weights and containing some compounds wherein the terminal glycidyl radicals are in hydrated form, the epoxy equivalency of the product is not necessarily the interger 2.0. The 1,2-epoxy equivalency of the polyethers is thus a value between 0 and 2.0.

Resinous polymeric epoxides or glycidyl polyethers suitable for use in accordance with the present invention may be prepared by admixing and reacting from one to ten mol proportions of an epihalohydrin, preferably epichlorohydrin, with from one to three mol proportions of bis-phenol A in the presence of at least a stoichiometric excess of alkali based on the amount of halogen.

To prepare the resinous polymeric epoxides, aqueous alkali, bis-phenol A and epichlorohydrin are introduced into and admixed in a reaction vessel. The aqueous alkali serves to dissolve the bis-phenol A with the formation of the alkali salts thereof. If desired, the aqueous alkali and bis-phenol A may be admixed and the epichlorohydrin added thereto, or an aqueous solution of alkali and bis-phenol A may be added to the epichlorohydrin. In any case, the mixture is heated in the vessel to a temperature within the range of from about 80° C. to 110° C. for a period of time varying from about one-half hour to three hours, or more, depending on the quantity of reactants used.

Upon completion of heating, the reacting mixture separates into layers. The upper aqueous layer is withdrawn and discarded, and the lower layer, containing the desired epoxy, is washed with hot water to remove unreacted alkali and halogen salts, in this case, sodium chloride. If desired, dilute acids, for example, acetic acid or hydrochloric acid, may be employed during the washing procedure to neutralize the excess alkali.

The liquid glycidyl polyethers suitable for use in accordance with the present invention may also be defined in terms of their epoxy equivalent weight. This value is derived by dividing the molecular weight of the composition by the average epoxy equivalency of the polyether. In the present case epoxy resins having epoxy equivalent weights within the range of about 170 to about 450 may be employed. Within this range, the preferred equivalent weight is from about 170 to about 250. Values above 450 result in relatively high viscosities and are therefore less desirable.

The glycidyl polyether-novolac resins suitable for combining with and for curing by catalysts in accordance with this invention are prepared by condensing an epihalohydrin with a novolac resin of an aldehyde and a monohydric mononuclear alkyl phenol containing at least four carbon atoms in the alkyl group, which novolac resin contains about three to twelve phenolic hydroxyl groups per average molecule. The term "novolac" as used herein refers to phenol-aldehyde resins prepared by reacting at least one phenol with at least one aldehyde in the ratio of 1 mol of phenol to from about 0.5 to 0.85 mol of aldehyde using an acidic catalyst. The condensation is effected by mixing the novolac resin with at least 3 mols of an epihalohydrin such as epichlorohydrin per phenolic hydroxyl equivalent of novolac resin and with addition of about 1 mol of alkali metal hydroxide per phenolic hydroxyl equivalent of novolac resin. The reaction mixture is maintained with the range of about 60° C. to 150° C. during the ensuing reaction. Upon completion of the reaction, the formed alkali metal salt and any unreacted hydroxide are removed from the resulting epoxynovolac resin and the resultant epoxy-novolac, in the form of a viscous liquid or solid, is separate from the reaction mixture and may be purified, if required.

The obtained epoxy-novolac resins may vary from very viscous liquids to solids at normal temperatures (20° C). Even the normal solid resins are fusible. The resins have a very complicated chemical structure. Analysis indicates that the majority such as about 60 to 90 or more percent of the hydrogen atoms of the phenolic hydroxyl group of the original novolac resin are replaced by glycidyl radicals. The epoxy-novolac resins also contain an appreciable proportion of alcoholic hydroxyl groups which are largely present in 2,3-dihydroxypropyl radicals that have replaced hydrogen atoms of phenolic hydroxyl groups of the original novolac resin. A small proportion of chlorine is contained in the resin, some of which is present in 3-chloro-2-hydroxyl propyl groups and some in more complicated groups which are 3-chloro-2-(3-chloro-2-hydroxypropyloxy) propyl and 3-chloro-2-(2,3-epoxy-propyloxy) propyl radicals linked to the phenolic ether oxygen atoms in the epoxy resin. The product may contain an insignificant amount of phenolic hydroxyl groups, i.e., at most, less than about 0.3 per average molecule.

The glycidyl polyethers of this invention are cured by further reaction with one or more of certain selected curing agents. Specifically, anhydrides which may be employed are hexahydrophthalic anhydride, tetrahydrophthalic anhydride, and mixtures or eutectics thereof. The anhydrides are used in amounts of about 50–90 parts by weight for each 100 parts by weight of epoxy resin and/or epoxy novolac. Other anhydrides such as phthalic, maleic, and methyl nadic anhydride may also be present in small amounts up to about 20% by weight of the primary anhydrides. Other curing agents such as aromatic polyamides, or amine curing agents may also be employed in the invention. Specifically, meta-phenylene diamine, dimethyl aniline and the like may be used.

In order that the glycidyl polyether-anhydride mixture may be cured within reasonable periods of time at temperatures of about 130–150° C., it is desirable to employ a small amount, within the range of about 0.05–2.0 parts by weight, of an accelerator for each 100 parts of the glycidyl polyether. The accelerators are selected from the group consisting of organic amines, metal amine chelates, amine borates, and polyborate esters. More than one of the accelerators may be employed simultaneously. Examples of suitable amines include monoethanolamine, piperidine, diethanolamine, triethanolamine, ethylenediamine, diethylenetriamine, dimethylaminopropylamine, pyrrolidine, and dimethyl aminomethyl phenol.

The metallic amine chelates which may form a portion of the curing catalyst of this invention may be prepared by initially reacting one mol of a metal ester, having the general formula $M(OR)_4$ with two mols of triethanolamine and distilling off two mols of the low boiling alcohol ROH where R represents the organic radical in the metal ester. Suitable metallic amine chelates which may be used in this invention include titanium amine chelate, aluminum amine chelate and silicone amine chelate. Particularly satisfactory results have been achieved when the metal amine chelate of this invention is titanium amine chelate.

The polyborates esters used in conjunction with the titanium amine chelate are well known in the art and are described in detail in U.S. Pat. No. 2,942,981 to Elbling et al. Particularly satisfactory results having been achieved by using the polyborate estertrihexylene glycol biborate.

In carrying out the casting procedure of the present invention there is admixed, for each 100 parts by weight of the selected resin, about 400 to about 900 parts by weight of the hereinbefore described particle size graded mineral filler, about 50 to about 90 parts by weight of the selected anhydride or anhydride mixture, and from about 0.05 to about 2.0 parts by weight of the selected resin curing accelerator. This combination of compounds produces a very fluid system when heated to about 100° C. Even at mineral filler content of about 80 weight percent the viscosity will normally not exceed about 20,000 centipoises at 100° C.

It has also been found that the inclusion of relatively small amounts of the order of 0.1 to 2% of a finely divided thixotropic agent in the resin-filler composition prevents undue settling of the filler particles. Suitable thixotropic agents include oxides of metals such as silicon, titanium, antimony, zinc, and the like of a particle size of about 0.01–40 microns. The heated mixture is then poured around the electrical element to be encapsulated, in a suitable mold, and is baked at about 100° C. for about 4–20 hours followed by a post cure of about an equivalent time period at 150° C. to 180° C. The combination of relatively low viscosity epoxy resin-filler composition containing up to about 80% of mineral filler produces a cured, rigid resin characterized by excellent electrical and physical properties. The cured insulation has a coefficient of linear thermal expansion which is closely related to the C.L.T.E. value of the electrical element and the encapsulated apparatus has excellent crack resistance even when the apparatus contains massive metal components.

In order to more particularly describe the invention, the following specific examples are set forth. The parts given are by weight unless otherwise indicated. It is to be understood that the examples are given for the purpose of illustration only.

Example I

A liquid glycidyl polyether was prepared by introducing into a reaction vessel equipped with agitator, cooling and heating means, distillation condenser and receiver, 513 parts (2.25 mols) of bis-phenol A, 2081 parts (22.5 mols) of epichlorohydrin, and 10.4 parts of water. A total of 188 parts of 97.5% sodium hydroxide, corresponding to 2.04 mols (2% excess) per mol of epichlorohydrin, was added in increments over several hours. The temperature in the vessel did not rise above 100° C. and was generally not above 95° C. After all the sodium hydroxide was added, the excess water and epichlorohydrin were removed by evacuating to be an absolute pressure of 50 mm. of mercury at 150° C. The vessel was then cooled to 90° C. and 36 parts of benzene added, and then cooled further to 40° C. with salt precipitating from the solution. The solution was filtered to remove the salt, the salt being washed with 36 additional parts of benzene, the benzene washing out any polyether resin, and then adding this benzene to the filtrate and both returned to the vessel. The benzene was then distilled off, the polyether resin being heated at an increasing temperature until at 125° C., vacuum was applied and distillation was continued until the vessel contents were at 170° C. at 25 mm. of mercury absolute pressure. The glycidyl polyether had an epoxy equivalent weight of about 180–210.

The following example describes the preparation of a particular metal amine-polyborate ester complex.

EXAMPLE II

Three mols of triethanolamine titanate and two mols of trihexylene glycol biborate were charged into a suitable vessel and heated at a temperature in the range of 100° C. to 135° C. for a period of approximately 3–4 hours.

The reaction product was a clear, slightly yellow liquid, suitable for use in accelerating the curing of glycidyl polyether resins in accordance with the teaching of the invention.

Example III

This example illustrates the preparation of an epoxy-novolac resin in which the novolac was a condensate of paratertiary butylphenol and formaldehyde. 328 parts of the novolac resin was dissolved in 920 parts of epichlorohydrin and 5 parts of water. Small pellets of sodium hydroxide in an amount of 82 parts were divided into six portions of approximately equal weight. The first portion was added to the solution with stirring and the mixture was heated rapidly to about 80° C. Heating was then discontinued and the heat of reaction carried the temperature up to about 100° C. At ten-minute intervals, the remaining portions of sodium hydroxide were added while keeping the temperature at about 95° C. to 100° C. After addition of all the sodium hydroxide, the mixture was stirred and refluxed for one hour. The epichlorohydrin and water were then distilled off at atmospheric pressure to a kettle temperature of about 130° C. While still warming, about 450 parts of benzene were added to the mixture and the precipitated sodium chloride was removed by filtration. The benzene was distilled off under vacuum up to a temperature of about 140° C., under a pressure of about 4 mm. of mercury, leaving 398 parts of epoxy-novolac resin.

Example IV

A casting resin composition was prepared by mixing together 100 parts of the epoxy resin produced in Example I, 80 parts of hexahydrophthalic anhydride, 0.18 part of dimethyl aminomethyl phenol, 5.4 parts of chromium oxide pigment, 28.0 parts of silicon dioxide in finely divided form (average particle size of less than 1 micron), and 506.0 parts of beryllium aluminum silicate (beryl) having the following particle size distribution:

| Cumulative wt. percent | Particle size, microns | Sieve size, mesh (U.S. screen No.) |
| --- | --- | --- |
| 2.5 | $\geq 250$ | 60 |
| 14.5 | $\geq 149$ | 100 |
| 26.5 | $\geq 105$ | 140 |
| 40.5 | $\geq 74$ | 200 |
| 58.5 | $\geq 53$ | 270 |
| 66.8 | $\geq 10$ | |

The mineral filled resin composition (75% filler) had a viscosity at 100° C. of 12,000 cps. (Brookfield at 10 r.p.m.) and was extremely fluid. The composition was cast around an electrical element. The cast assembly was then baked at 100° C. for 16 hours followed by a post cure bake of 16 hours at 150° C. The cured cast resinous composition had a C.L.T.E. of $20.0 \times 10^{-6}$ inch/inch/° C. within a temperature range of 25–125° C.

Cast samples were tested for crack resistance by the so-called 3M (Minnesota Mining and Manufacturing Company) Washer Test and a "bolt washer text." All samples passed both of these tests successfully.

In the 3M washer test, a steel washer ¼" thick and 1½" diameter encapsulated in the resin composition is cycled 10 times from room temperature to about −75° C. in a Dry Ice-acetone bath. The washer is held at the lower temperature for about 20 minutes in each cycle. The sample must pass this test without cracking before being further tested.

The "bolt washer test" uses a series of square steel washers of 1¾" and 2" sides and ⅛" thickness and with two interposed vulcanized fiber washers 1½" on a side and about ½" thickness on a 5" long ½" diameter steel bolt with a threaded hexagonal nut at one end. The encapsulated bolt, nut and washers embedded in a 2½" thick block of over 4" in lateral dimensions of the cured resin composition is cycled a maximum of 30 times between 150° C. and —30° C. and held at each of these temperatures for 6 hours during each cycle. Severe stress is placed on the encapsulating resin component of the system during this cycling test.

Example V

The procedure of Example IV was repeated with the exception that the resinous casting composition contained as a filler, by weight, 75% of fused quartz having the following particle size distribution:

| Cumulative wt. percent | Particle size, microns | Sieve size, mesh (U.S. screen No.) |
|---|---|---|
| 2.5 | >250 | 60 |
| 14.5 | >149 | 100 |
| 26.5 | >105 | 140 |
| 39.5 | >74 | 200 |
| 57.0 | >53 | 270 |
| 75.0 | >10 | |

The casting composition had a viscosity, at 100° C., of 13,500 cps. and was pourable and very free flowing. The cured cast resinous composition had a C.L.T.E. of $18.0 \times 10^{-6}$ inch/inch/° C. within a temperature range of 25°–125° C.

Electrical elements encapsulated with the above casting composition successfully passed all thermal cycling tests. Exceptional results were obtained with electrical transformer coils so encapsulated.

Example VI

The procedure of Example IV was repeated using sand as the mineral filler. The sand employed had the following particle size distribution:

| Cumulative wt. percent | Particle size, microns | Sieve size, mesh (U.S. screen No.) |
|---|---|---|
| 9.0 | >210 | 70 |
| 18.6 | >149 | 100 |
| 30.0 | >105 | 140 |
| 44.3 | >74 | 200 |
| 51.5 | >53 | 270 |
| 60.8 | >30 | |
| 68.3 | >20 | |
| 80.3 | >10 | |

The casting composition, containing 77% by weight of the above graded sand filler had a viscosity of only 10,000 cps. and was extremely fluid. The cured cast resinous composition had a C.L.T.E. of $28.0 \times 10^{-6}$ inch/inch/° C.

Electrical elements, including foil wound coils, encapsulated with the above casting composition had good electrical properties. In particular, the cast and cured resin composition had exceptionally good arc and track resistance.

Example VII

The procedure of Example IV was repeated using lithium aluminum silicate as the mineral filler. The mineral filler had the following particle size distribution:

| Cumulative wt., percent | Particle size, microns | Sieve size, mesh (U.S. screen No.) |
|---|---|---|
| 2.5 | >250 | 60 |
| 12.5 | >149 | 100 |
| 24.5 | >105 | 140 |
| 38.9 | >74 | 200 |
| 57.2 | >53 | 270 |
| 71.4 | >10 | |

The casting composition, containing 75% by weight of the above mineral filler, had a viscosity of 10,000 cps. and was very fluid. The cured cast resinous composition had a C.L.T.E. of only $12 \times 10^{-6}$ inch/inch/° C.

Electrical elements encapsulated with this casing composition successfully passed all thermal cycling tests. It should be noted that this cured resin had a coefficient of linear thermal expansion comparable to steel.

Example VIII

A casting composition containing 73 weight percent filler was prepared as follows: 50 parts epoxy resin from Example I, 50 parts epoxy novolac from Example III, 76.5 parts hexahydrophthalic anhydride, 8.5 parts tetrahydrophthalic anhydride, 530 parts of beryllium aluminum silicate with a particle size distribution as in Example IV, 0.18 part dimethyl aminomethyl phenol, 18 parts silicon dioxide (finely divided). The viscosity of this casting composition was 5000–7000 cps. Cast electrical elements successfully passed all thermal cycling tests.

The above casting composition was also prepared employing as the resin curing accelerator 0.5 part of the titanate-biborate complex of Example II. Equally good test results were obtained using this curing accelerator.

Example IX

A resinous composition was prepared by mixing together in parts by weight, 100 parts of a liquid diglycidyl ether of bisphenol A having an epoxy equivalent weight of 180–200 and sold by Jones-Dabney Company under the trademark Epi Rez 510, 80 parts hexahydrophthalic anhydride, 0.18 part dimethyl aminomethyl phenol. To this resin formulation was added 506 parts of silica (silicon dioxide) having the following particle size distribution:

| Cumulative wt., percent | Particle size, microns | Sieve size, mesh (U.S. screen No.) |
|---|---|---|
| 15 | >210 | 70 |
| 31 | >149 | 100 |
| 50 | >105 | 140 |
| 74 | >74 | 200 |
| 86 | >53 | 270 |

The mineral filled resin composition (73% filler) had a viscosity at 100° C. that was too thick to measure and the composition was not uniform and was very lumpy. This filler distribution is just outside our critical particle size range and is an example showing the criticality of that range.

From the foregoing description it will be appreciated that resinous casting compositions characterized by high mineral loading are obtained in practicing the present invention. The cast and cured compositions are greatly improved in crack resistance due to the close correlation of the coefficients of linear thermal expansion of the casting and the metal employed. It should also be noted that mixtures of various fillers can be used advantageously so long as the total filler range is within the liimts established by Table I.

I claim as my invention:

1. A fluid resinous casting composition, suitable for use with electrical apparatus elements, comprising (A) for each 100 parts by weight of a liquid resin, (B) about 400–900 parts by weight of at least one mineral filler characterized by a coefficient of linear thermal expansion not greater than about $8 \times 10^{-6}$ inch/inch/° C. said mineral filler having a cumulative particle size distribution range as follows:

TABLE I

| Cumulative wt., percent | Particle size, microns | Sieve size, mesh (U.S. screen No.) |
| --- | --- | --- |
| 0.1–4 | >297 | 50 |
| 0.3–9 | >250 | 60 |
| 1–14 | >210 | 70 |
| 4–26 | >149 | 100 |
| 9–34 | >125 | 120 |
| 14–41 | >105 | 140 |
| 20–48 | >88 | 170 |
| 28–56 | >74 | 200 |
| 34–62 | >63 | 230 |
| 42–68 | >53 | 270 |
| 45–70 | >44 | 325 |
| 47–73 | >37 | 400 |
| 56–79 | >20 | |
| 65–85 | >10 | |

(C) about 50–90 parts by weight of a resin curing agent, and (D) about 0.05–2 parts of a resin curing accelerator.)

2. The resinous casting composition of claim 1 having a viscosity below 20,000 cp. at 100° C. wherein the liquid resin is selected from the group consisting of epoxy, epoxy novolac, and mixtures thereof, said resin having terminal epoxy groups and an epoxy equivalent weight of about 170–450 and the mineral filler is selected from the group consisting of silica, fused quartz, beryllium aluminum silicate, lithium aluminum silicate and mixtures thereof.

3. A fluid resinous casting composition, suitable for use with electrical apparatus elements, comprising a liquid resin and a finely divided mineral filler having a coefficient of linear thermal expansion not greater than about $8 \times 10^{-6}$ inch/inch/° C. said mineral filler having a cumulative particle size distribution range as follows:

TABLE I

| Cumulative wt., percent | Particle size, microns | Sieve size, mesh (U.S. screen No.) |
| --- | --- | --- |
| 0.1–4 | >297 | 50 |
| 0.3–9 | >250 | 60 |
| 1–14 | >210 | 70 |
| 4–26 | >149 | 100 |
| 9–34 | >125 | 120 |
| 14–41 | >105 | 140 |
| 20–48 | >88 | 170 |
| 28–56 | >74 | 200 |
| 34–62 | >63 | 230 |
| 42–68 | >53 | 270 |
| 45–70 | >44 | 325 |
| 47–73 | >37 | 400 |
| 56–79 | >20 | |
| 65–85 | >10 | |

References Cited

UNITED STATES PATENTS 3,328,339   6/1967   Tierney _____ 260—37

FOREIGN PATENTS 450,445   7/1936   Great Britain _____ 260—38

OTHER REFERENCES

Lee, H. L. and Neville, K. O.: Epoxy Resins, McGraw-Hill, 1957, pp. 149–151.

MORRIS LIEBMAN, Primary Examiner

S. M. PERSON, Assistant Examiner

U.S. Cl. X.R.

260—38